United States Patent
Avrahami et al.

(10) Patent No.: US 11,120,326 B2
(45) Date of Patent: Sep. 14, 2021

(54) SYSTEMS AND METHODS FOR A CONTEXT AWARE CONVERSATIONAL AGENT FOR JOURNALING BASED ON MACHINE LEARNING

(71) Applicant: FUJIFILM Business Innovation Corp., Tokyo (JP)

(72) Inventors: Daniel Avrahami, Mountain View, CA (US); Jennifer Marlow, Palo Alto, CA (US); Rafal Kocielnik, Seattle, WA (US); Di Lu, Pittsburgh, PA (US)

(73) Assignee: FUJIFILM Business Innovation Corp., Tokyo (JP)

( * ) Notice: Subject to any disclaimer, the term of this patent is extended or adjusted under 35 U.S.C. 154(b) by 677 days.

(21) Appl. No.: 15/866,269

(22) Filed: Jan. 9, 2018

(65) Prior Publication Data

US 2019/0213465 A1 Jul. 11, 2019

(51) Int. Cl.
| | |
|---|---|
| *G06N 3/00* | (2006.01) |
| *G10L 15/18* | (2013.01) |
| *G10L 15/197* | (2013.01) |
| *G06N 20/00* | (2019.01) |
| *G10L 15/22* | (2006.01) |

(52) U.S. Cl.
CPC ............ *G06N 3/006* (2013.01); *G06N 20/00* (2019.01); *G10L 15/1807* (2013.01); *G10L 15/197* (2013.01); *G10L 15/22* (2013.01); *G10L 2015/226* (2013.01)

(58) Field of Classification Search
None
See application file for complete search history.

(56) References Cited

U.S. PATENT DOCUMENTS

| | | | | |
|---|---|---|---|---|
| 2008/0171573 A1* | 7/2008 | Eom | ................... | G06F 16/955 455/556.2 |
| 2014/0257819 A1* | 9/2014 | Li | ....................... | G06F 1/1694 704/260 |

(Continued)

OTHER PUBLICATIONS

Liao, Q. V., et al., What Can You Do? Studying Social-Agent Orientation and Agent Proactive Interactions with an Agent for Employees, DIS 2016, Jun. 4-8, 2016, Brisbane, QLD, Australia, 12 pgs.

(Continued)

*Primary Examiner* — Abdullah Al Kawsar
*Assistant Examiner* — David V Luu
(74) *Attorney, Agent, or Firm* — Procopio, Cory, Hargreaves & Savitch LLP

(57) ABSTRACT

Example implementations are directed to systems and methods for a context aware conversational agent for self-learning. In an example implementation, a method includes generating a journaling model based on activity data and engagement data associated with one or more tasks of a user. The journaling model uses machine-learning to identify a context pattern using the activity data, and maps performance associated with the one or more tasks based at least on the engagement data. The method adaptively provides a prompt to gather additional engagement data based on the context pattern in view of real-time activity data, where the prompt is generated based on the journaling model. The journaling model is updated based on the additional engagement data.

19 Claims, 8 Drawing Sheets

(56) References Cited

U.S. PATENT DOCUMENTS

| | | | | |
|---|---|---|---|---|
| 2014/0279050 | A1* | 9/2014 | Makar | G06N 20/00 |
| | | | | 705/14.66 |
| 2015/0095771 | A1* | 4/2015 | Karakaya | G06Q 10/06314 |
| | | | | 715/273 |
| 2017/0039480 | A1* | 2/2017 | Bitran | G06N 20/00 |
| 2018/0232625 | A1* | 8/2018 | Vinkers | G16H 20/30 |
| 2019/0013017 | A1* | 1/2019 | Kang | G06N 99/005 |
| 2019/0147042 | A1* | 5/2019 | Raghavan | G06Q 10/10 |
| | | | | 706/11 |
| 2019/0189117 | A1* | 6/2019 | Kumar | H04L 51/02 |
| 2019/0265946 | A1* | 8/2019 | Bae | G06F 3/167 |

OTHER PUBLICATIONS

Schmandt, C., Everywhere Messaging, Springer-Verlang Berlin Heidelberg, 1999, HUC '99, LNCS 1707, pp. 22-27.

Nobel, C., Reflecting on Work Improves Job Performance, Harvard Business School, May 5, 2014, 7 pgs., [online] [retrieved Jan. 9, 2018] URL: https://hbswk.hbs.edu/item/reflecting-on-work-improves-job-performance.

Amabile, T., et al., The Power of Small Wins, Harvard Business Review, May 2011, 89(5), 21 pgs., [online] [retrieved Jan. 9, 2018] URL: <https://hbr.org/2011/05/the-power-of-small-wins>.

* cited by examiner

SYSTEMS AND METHODS FOR A CONTEXT AWARE CONVERSATIONAL AGENT FOR JOURNALING BASED ON MACHINE LEARNING

BACKGROUND

Field

The present disclosure is generally directed to machine-learning, and more specifically, to systems and methods for providing a context aware conversational agent based on machine-learning.

Related Art

Journaling and self-reflection refers to an exercise of recording thoughts about experiences, ideas, behavior, beliefs, and goals. Journaling can help a person explore past activities to track progress, change behaviors, and realize goals. Self-tracking or lifelogging is the practice of incorporating technology into data acquisition on aspects of a person's daily life in terms of inputs, whether mental or physical, in order to quantify changes in daily activities. In a basic example, personal health trackers typically count a number of steps a user takes in a day. Conventional self-tracking tools suffer from poor user engagement that reduces the amount and/or quality of information collected.

Related art studies show that users have difficulty maintaining motivation and discipline to regularly journal about their behavior. Traditional self-tracking chat-based agents typically employ a single communication channel to deliver repetitive notifications. In related art for chat-based agents, workers are interrupted or receive pre-programmed prompts to help employers track monitor the employee's activity. In related art person-to-person communication systems, users can interact with each other through different communication channels (e.g., text or audio) where changes in the communication channel are not supposed to change the interaction.

SUMMARY

Example implementations described herein provide systems and methods for providing a context aware conversational agent based on a journaling model. In an example implementation, a method includes generating a journaling model based on activity data and engagement data associated with one or more tasks of a user. The journaling model uses machine-learning to identify context patterns using the activity data, and maps performance associated with the one or more tasks based at least on the engagement data. The method adaptively provides a prompt to gather additional engagement data based on the context patterns in view of real-time activity data, where the prompt is generated based on the journaling model. The journaling model is updated based on the additional engagement data.

A non-transitory computer readable medium, comprising instructions that when executed by a processor, the instructions apply the method when execute by a processor, to generate a journaling model based on activity data and engagement data associated with one or more tasks of a user. The journaling model uses machine-learning to identify context patterns based on the activity data, and map performance associated with the one or more tasks based at least on the engagement data. The processor generates a prompt based on the journaling model, adaptively provides the prompt to gather additional engagement data based on the context patterns in view of real-time activity data, and update the journaling model based on the additional engagement data.

An example aspect of the present disclosure relate to a computer apparatus configured to generate a journaling model based on activity data and engagement data associated with one or more tasks of a user. The journaling model uses machine-learning to identify context patterns based on the activity data, and map performance associated with the one or more tasks based at least on the engagement data. The processor generates a prompt based on the journaling model, adaptively provides the prompt to gather additional engagement data based on the context patterns in view of real-time activity data, and update the journaling model based on the additional engagement data.

The example implementations also include a system with means for generating a journaling model, a memory for storing the journaling model, means for machine-learning to identify context patterns based on the activity data, and map performance associated with the one or more tasks based at least on the engagement data; means for generating a prompt based on the journaling model, means for adaptively providing the prompt to gather additional engagement data based on the context patterns in view of real-time activity data, and means for updating the journaling model based on the additional engagement data.

Other features and advantages of the present inventive concept will become more readily apparent to those of ordinary skill in the art after reviewing the following detailed description and accompanying drawings.

BRIEF DESCRIPTION OF THE DRAWINGS

The structure and operation of the example implementations will be understood from a review of the following detailed description and the accompanying drawings in which like reference numerals refer to like parts and in which.

DETAILED DESCRIPTION

Figure 1:
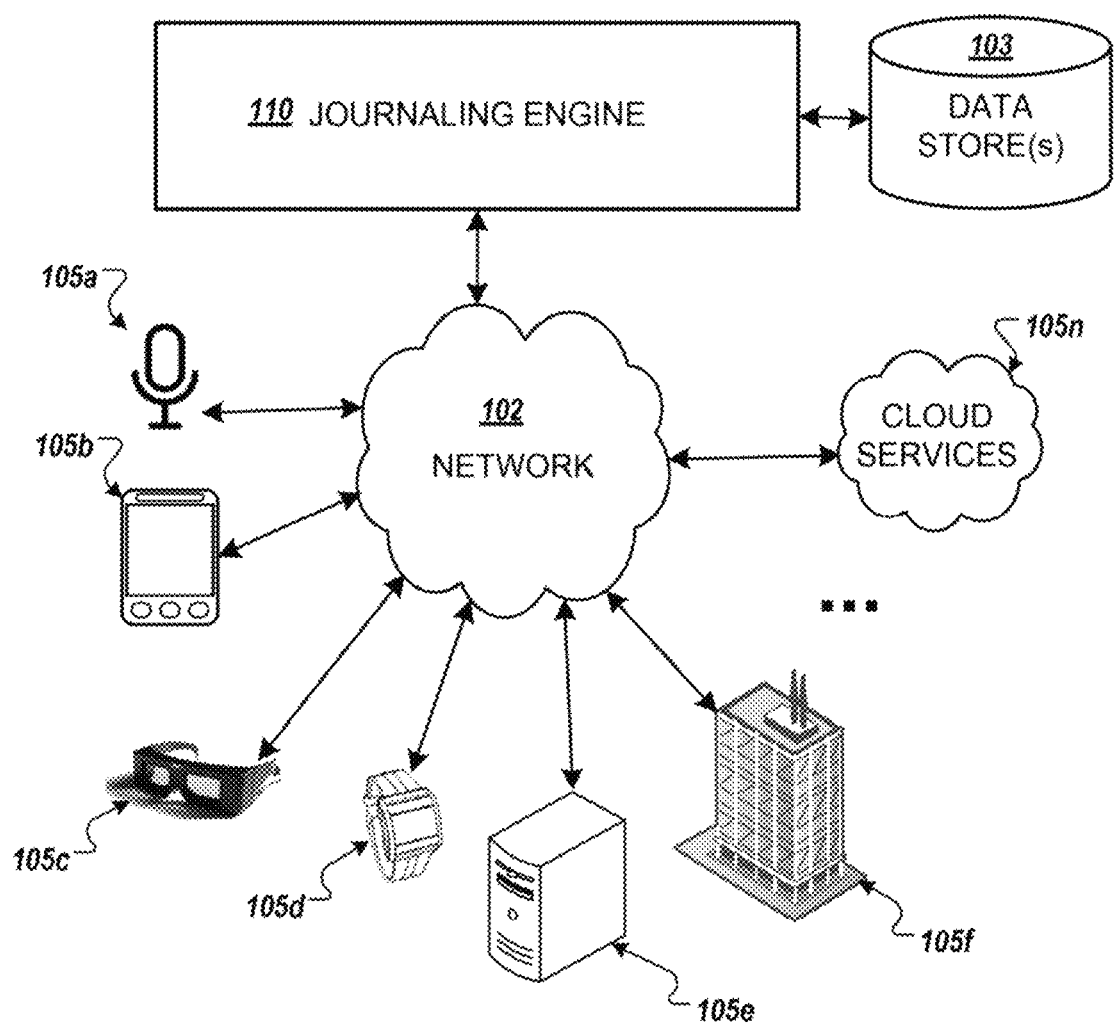
FIG. 1 illustrates an overview of a system in accordance with an example implementation.

The following detailed description provides further details of the figures and example implementations of the present application. Reference numerals and descriptions of redundant elements between figures are omitted for clarity.

Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

Described herein is a conversational software agent, cloud service, and system for self-reflection that helps a user regularly engage in journaling over long periods of time to improve the user's self-knowledge for achieving goals. The conversational agent uses machine-learning to model activities and journal entries of the user. A personalized journaling model tracks a user's performance and generates autonomous interactions that adapt to changes in a user's environment, activities, and goals. The journaling model is generated with personal informatics gathered from devices, sensors, pervious journal entries, etc. The conversational agent can initiate or prompt the user to provide a journal entry. A prompt is part of the autonomous interaction that initiates or motivates the user to record a reflection or journal entry. For example, a prompt can be a question generated based on sensed digital activity of the user, a schedule task, tracked goal, previous reflection, etc. The journaling model is used to determine context factors that strengthen or weaken an association between a stimulating factor and an activity or subject of the journal.

The conversational software agent is configured to improve an individual user's engagement in recording of thoughts, activities, experiences, ideas, and/or private self-reflections. From the autonomous interaction, engagement data is received that includes the user's reaction to prompts (e.g., journal entries, reflections, goals, feedback, etc.) and context factors that identify the preferred communication patterns. Journal entries can refer to information provided by the user that is input into the journaling model. For example, a journal entry can include a report on performed tasks or expression of a though regarding a topic or upcoming event. The engagement data is analyzed to update the journaling model with topics, task progress, goal completions and other performance measurements. In some implementations, analysis of the engagement data can also be used to track emotions, language patterns, and preferences as part of the journaling model.

Journaling and self-reflection is an important practice for people to learn from past experiences, interpret complex problems, and improve productivity. In workplace and personal settings, journaling is a useful mechanism to translate experience into learning, aids in growth and development of skill, and builds worker confidence in the ability to achieve goals. For example, related art studies have shown that reflection and feedback can improve the quality of graphic design or lead to improved performance on an e-mail based work simulation task. Related art studies also show that employees in a workplace setting particularly lose motivation to journal due to time pressures, environmental constraints, and ineffective tools. By effectively tracking changes in activities and regularly recording thoughts about experiences, users can build an understanding of the causal mechanisms behind actions and outcomes. However, traditional repetitive chat-bots are monotonous and interrupt productivity causing user attrition.

Accordingly, intelligent self-tracking tools are needed that adapt to changing patterns of the user and maximize engagement opportunities to improve a person's self-knowledge.

Example aspects are directed to improving the frequency, quality, productivity, and user experience of the individual user's engagements in journaling and self-reflection. Aspects of the example implementation are directed to content analysis of worker-generated work-logs and plans, with sensed context to improve the timing, channel choice, and language use for a conversational-agent interaction. The system allows content from the user's work and behavior to influence the system's behavior for more effective engagement in journaling.

According to an example aspect, self-tracking with sensors and device monitoring is used to generate personal informatics that can improve a person's self-knowledge about one's behaviors, habits, thoughts, etc. The context aware conversational agent learns preferences of the user to communicate through multiple communication channels (e.g., text, voice, visual) and adapt the communication based on the user's environment, activities, habits, and goals. For example, the conversational agent can determine whether to engage the user through a smart phone with a text message when traveling to a meeting, a personal assistant device with an audio message during a quiet afternoon, or an augment reality headset with a visual avatar by learning the user's work and journaling patterns.

The context aware conversational agent is configured to assist the user, for example, manage a systematic plan (e.g., diet, therapy, medication, etc.), adjust behavioral habits, and/or track progress of daily tasks. For example, the context aware conversational agent can engage a patient on a medication or therapy regimen about effects of the medication or about food they ate while on the regimen to assist with managing health goals, as well as, provide useful information and insights to influence their regular course of action.

According to an example implementation, the conversational agent generates custom prompts based on the journaling model and type of communication channel to effectively communicate with the user engagement. For example, a prompt can include a reminder or series of questions to motivate the user to provide a reflection or journal entry. The conversational agent can generate different prompts for different communication channels. For example, a text based prompt delivered to the user's phone can be customized to be short and concise while a text based prompt delivered to a messaging interface on a desktop computer can be customized to be detailed and though provoking.

In an example implementation, language of the prompt can be modified based on the user's performance and/or communication patterns. The journaling model analyzes content of the recordings, messages, and monitored activities to dynamically generate different prompts that correspond to the communication characteristics of the user such as particular terms, sentence structure, tone, etc. For example, the prompt can be modified to include a 'why question' as follow-up to a user reflection that is identified as apathetic.

In an example implementation, the conversational agent learns the preferred communication patterns and configures controllable devices and/or settings of devices during presentation of the prompt. That is, the conversational agent can configure, for example, settings of mobile devices or Internet-of-Things (IoT) devices to improve the environment settings while the user is engaging in journaling and self-reflection. In an example implementation, the conversational agent adjusts the volume, lighting, screen resolution, etc. of devices in the user's environment based on the user's previous responses, behaviors, activities, and/or instruction to reduce environmental constraints. For example, the conversational agent can select a smartphone of the user to present the generated prompt in a particular font size or audio volume, adjust the brightness setting of the display screen on the smartphone, and play a song or musical note, as well as, simultaneously command a work station computer to dim a monitor, activate a screen saver, delay notifications, etc. while the user responds to the prompt.

A software agent or service provides autonomous interaction with an individual user that is conversational by using customized prompts based on machine-learning applied to the user's previous responses, behaviors, activities, and/or preferences. The conversational agent provide functionality to aid with organization, productivity, and self-learning in the workplace, where user needs may be different and avoiding disrupting work and efficiency are important. An aspect of the example implementation is described in reference to a workplace setting, such as an office environment, assembly line, construction site, retail stand, etc.

However, the scope of the example implementations is not limited to a specific environment, and other environments may be substituted therefor without departing from the inventive scope. For example, but not by way of limitation, other environments in which self-realization can help a person and can include recreational environments other than an office or workplace, such as a gym, as well as therapeutic environments (e.g., hospitals, physical therapy centers, etc.), but are not limited thereto.

FIG. 1 illustrates an overview of a system 100 in accordance with an example implementation. The system 100 includes a journaling engine 110 configured to communicate with one or more client devices 105a-105n to provide a context aware conversational agent for prompting a user to provide a journal entry. The journaling engine 110 may be implemented in the form of software (e.g., instructions on a non-transitory computer readable medium) running on one or more processing devices, such as the one or more client devices 105a-105d, as a cloud service 105n, remotely via a network 102, or other configuration known to one of ordinary skill in the art.

The terms "computer", "computer platform", processing device, and client device are intended to include any data processing device, such as a recording device 105a, a smartphone 105b, a tablet computer, a portable display device 105c, a wearable or physiologically coupled device 105d, a desktop computer 105e, a laptop computer, a mainframe computer, a server, a handheld device, a portable speaker, a digital signal processor (DSP), an embedded processor, or any other device able to process data. The computer/computer platform is configured to include one or more microprocessors communicatively connected to one or more non-transitory computer-readable media and one or more networks.

The journaling engine 110 directly or indirectly includes memory such as data store(s) 103 (e.g., RAM, ROM, and/or internal storage, magnetic, optical, solid state storage, and/or organic), any of which can be coupled on a communication mechanism (or bus) for communicating information.

In an example implementation, the journaling engine 110 can be hosted by a cloud service 105n and communicatively connected via the network 102 to client devices 105a-105n in order to send and receive data. The term "communicatively connected" is intended to include any type of connection, wired or wireless, in which data may be communicated. The term "communicatively connected" is intended to include, but not limited to, a connection between devices and/or programs within a single computer or between devices and/or separate computers over the network 102. The term "network" is intended to include, but not limited to, packet-switched networks such as local area network (LAN), wide area network (WAN), TCP/IP, (the Internet), and can use various means of transmission, such as, but not limited to, WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

Data associated with the user, or the environment of the user, may come from different types of client devices 105a-105n. Client devices 105a-105n can include, for example, recording devices 105a, mobile computing devices 105b (e.g., smart phones, laptops, tablets, etc.), presentation systems 105c (e.g., augmented or virtual reality headsets, projectors, live walls, etc.), sensor systems 105d (e.g., wearable technology including fitness trackers, physiological sensors, biometric sensors, location sensors, GPS units, Bluetooth® beacons, cameras, etc.), computing devices 105e (e.g., desktops, mainframes, network equipment, etc.), location based systems 105f (e.g., control systems, building environment control devices, security systems, corporate infrastructure, etc.), as well as cloud services 105n (e.g., remotely available proprietary or public computing resources).

Client devices 105a-105n can include client services with functionality, for example, to autonomously interact with the user via different channels, collect and/or store sensed data, track locations, detect communications with external devices, and so forth. For example, the client devices 105a-105n can include client services to provide an audio based channel with a handheld recording device 105a, a text based channel with a mobile computing device 105b, a visual based channel with a presentation system 105c. Client services can also collect activity data of the user, for example, to detect location information with building sensors 105f, observe a user with a camera, monitor heart rate information with a wearable sensor system 105d, track work assignments and digital work from a corporate mainframe, etc. In example implementations, the journaling engine 110 receives information from multiple client device 105a-105n.

Client devices 105a-105n may also collect information from one or more other client device 105a-105n and provide the collected information to the journaling engine 110. For example, client devices 105a-105n such as a handheld recording device 105a can be communicatively connected to the other client device using WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

In an example implementation, the user may be located in an office environment that includes one or more client devices 105a-105n, and the user performs a work activity that is monitored by client services. While the user is performing the work activity, such as operating a device such as computer at a desk or moving items in a warehouse, the client services gather different types of information associated with the user that are communicated to the journaling engine 110. For example, location sensors 105f receive the user's movement in the office or warehouse, a scheduling application provides the user's meeting schedule, a wearable device 105d obtains a user's heart rate, and the information is sent to the journaling engine 110.

The journaling engine 110 can detect real-time activity that indicates if the user is alone in a private location, logged on to a chat client or website site, wearing an augmented reality headset, texting on a smartphone, etc. According to an example implementation, the journaling engine 110 can detect a trigger or event that indicates the user is available to provide a journal entry using the information. As described in greater detail below, in the example implementation, the journaling engine 110 generates a journaling model based on learning the user's patterns. In example implementation, the journaling model is generated using training data, rules, sensed activity, journal entries, feedback, etc.

The journaling engine 110 can adaptively motivate the user to engage a client device 105a-105e to engage in reflection and/or journaling activity associated with a topic. The journaling model determines a time, channel, and topic for the engagement, and can generate a custom prompt based on the time, channel, and topic using the activity data.

In an example, the user may be working on multiple projects and the journaling engine 110 can identify a journaling topic for an upcoming deliverable deadline using gathered calendaring information.

By modeling the user's behavior over time, the journaling engine 110 adaptively provides a context aware engagement prompts. The journaling engine 110 models the past behavior of the user during previous engagements and records communication preferences with the context pattern. The journaling engine 110 can then monitor real-time activity data at a location of the user to detect a trigger or event that is compared to the context patterns from the model. Based on the trigger and the model, the journaling engine 110 determines timing, topics, and preferred communication preferences (e.g., a text message via a smart phone, a voice message via a speaker, etc.).

In another implementation, the journaling engine 110 can use predictive analysis with probability distributions to predict that the user is likely to engage in journaling activity based on a detected context. Behavioral analysis on engagement data can score journaling content based on different scales (e.g., productivity, emotional, sentiment, topics, health, etc.).

In an example implementation, behavioral analysis can use predictive analysis with probability distributions to predict that the user is likely to engage in journaling activity based on a detected context. For example, the journaling engine 110 can determine or predict that the user is to engage in journaling activity via a handheld recording device immediately prior to a lunch break. The user may prefer, intend, or desire to consistency journal during a particular context, but the user may have difficulty remembering of a systematic plan or noticing the environmental constraints to achieving their goals. The journaling engine 110 can generate a prompt to reflect on the upcoming deliverable that is adapted for the preferred audio channel with a polite question in particular British accent.

When the time frame the user normally takes a lunch break approaches, the journaling engine 110 can monitor the real-time activity data to detect a trigger or event that indicates the user is ready to take the lunch break. For example, locking a computer session or ending a telephone call can be detected to initiate an audio message that prompts the user to reflect on the upcoming deadline.

For example, the context aware conversational agent can prompt the user to engage in journaling with different questions at different times of day. For a morning prompt around 10 a.m., "What did you accomplish yesterday?", "What are you planning to do today?" is helpful to log accomplishments and possibly trigger recollection of incomplete tasks. A mid-day at 1:30 p.m. can include "What have you accomplished earlier in the day?", "What are you planning to do for the rest of the day?" to assist user to proactively manage their time, identify short term goals, measure performance, and build confidence. Towards the end of the day, the prompt can include "What have you accomplished today?", "What are you planning to do tomorrow?" to assist the user to self-recognize performance and organize future activities. The agent can compare responses to related questions to generate follow-up prompts. For example, a response to "What are you planning to do today?" can be compared with response to "What have you accomplished today?" and "What are you planning to do tomorrow?" to generate a prompt "Did you accomplish <task>?" or "Would you like to schedule a reminder to complete <task>?."

The journaling engine 110 can also use the real-time activity monitoring to adapt or delay the prompt. For example, real-time location sensors can detect a visitor is at the user's desk and, based on the modeled user preference, adapt the prompt to be a short text message delivered to a smartphone rather than the audio message with a polite question in particular British accent.

Accordingly, the journaling engine 110 can interact with the client devices 105a-105n to collect activity data and provide a context aware conversational agent that effectively prompts the user to engage in journaling. By providing context aware prompts that adapt to the user preferences for timing, channel, and format, the journaling engine 110 can improve long-term user engagement with journaling and thereby assist with attain goals through self-realization.

Figure 2:
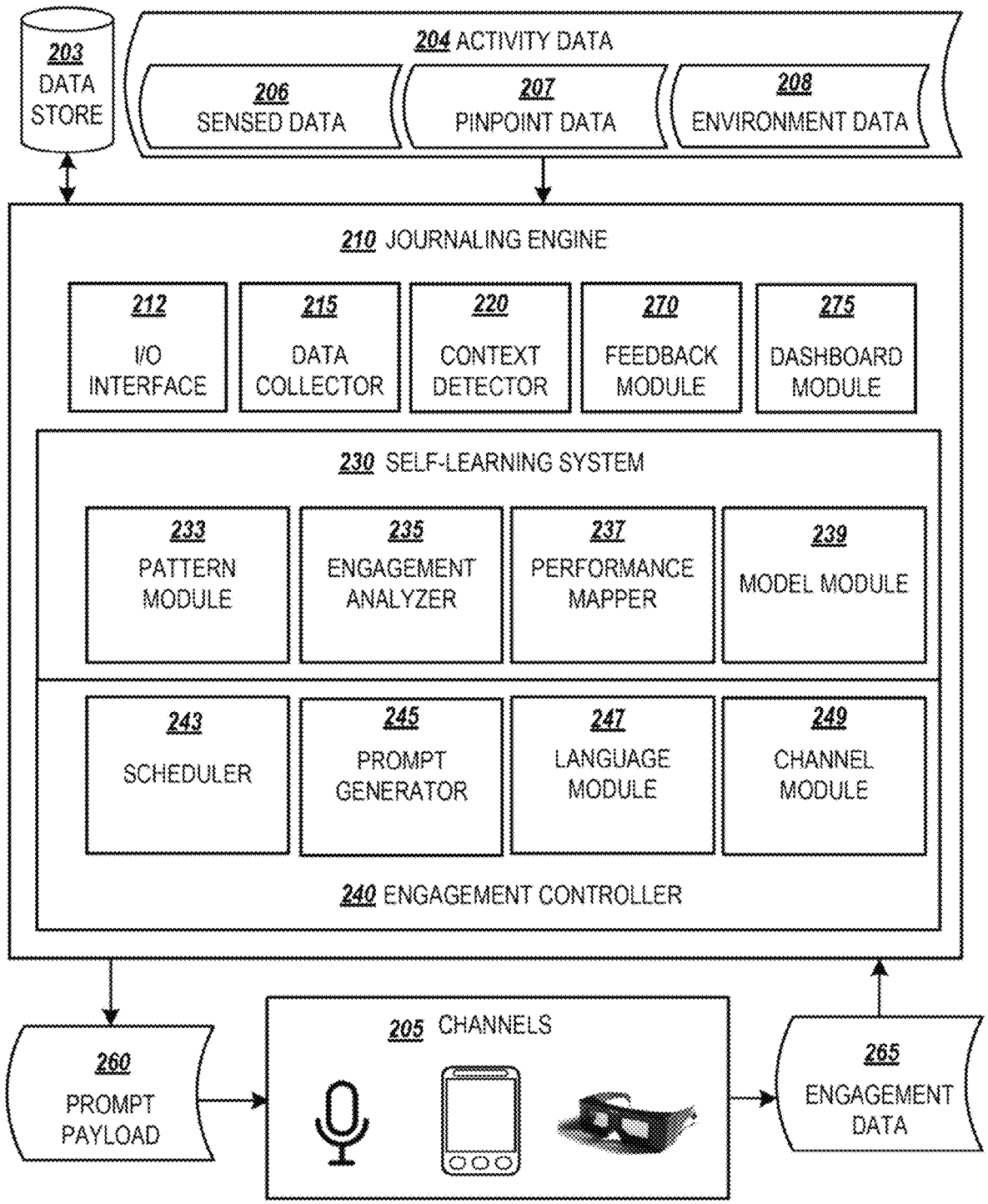
FIG. 2 illustrates an example journaling engine in accordance with an example implementation.

FIG. 2 illustrates an example system 200 including a journaling engine 210 in accordance with an example implementation. The journaling engine 210 includes one or more I/O interfaces 212, a data collector 215, a context detector 220, a self-learning system 230, an engagement controller 240, a feedback module 270, and a dashboard module 275. The journaling engine 210 is coupled to one or more data stores 203 for storing data (e.g., information, models, feedback, user profiles, etc.).

In an example implementation, the I/O interface 212 includes one or more communication interfaces communicatively connected with different types of communication channels 205 associated client devices (e.g., client devices 105a-105n of FIG. 1) directly or via a network (e.g., network 102 of FIG. 1) in order to receive activity data 204 (e.g., sensed data 206, pinpoint data 207, and/or environment data 208). The data collector 215 can use the I/O interface 212 to request, monitor, and/or receive activity data 204 from different types of communication channels 205, client devices, or client services. Further, each client device can provide multiple types of data, for example, sensed data 206, pinpoint data 207, and/or environment data 208.

The I/O interface 212 can include application programming interfaces (API) to connect with messaging applications, cloud services, artificial intelligent platform, building automation systems, etc. According to an example implementation, the journaling engine 210 can be integrated with or coupled to one or more artificial intelligent platforms as an add-on or skill. In an example implementation, the journaling engine 210 can access a digital personal assistant platform to accesses information and utilize existing interfaces and/or hardware. For example, a microphone of a remote control, speakers of an entertainment system, motion sensors of an alarm system, etc. can be used to gather activity data 204, provide a prompt payload 260, and receive engagement data 265.

The data collector 215 can discover sources for user's activity data 204, establish connections or request access to the data sources, and schedule to regularly collect updated activity data 204 as well as service on-demand or ad-hoc requests for activity data 204 from the self-learning system 230. For example, the data collector 215 can use digital tracking tools (e.g., cookies, tracing, fingerprinting, programmed hooks, browser plug-ins, etc.) to identify devices the user accesses, request authorization to access activity data 204 from the device, and receive notifications when the user access the device. The data collector 215 can also schedule to re-collect activity data 204 from the device after time interval so that the activity data 204 does not become stale or outdated.

In an example implementation, the activity data 204 can include sensed data 206 such as information about the user's physical activities. For example, a user may carry a mobile device (e.g., a client device and a communication channel 205) with various sensors that collect a user's movements (e.g., Bluetooth beacons), working behaviors, eating behaviors, etc. Pinpoint data 207 can include stored or tracked information about the user's digital activity. In an example implementation, monitoring software can collect information about the user's digital interactions, device usage, etc. For example, the monitoring software can collect a user's computer usage, machine interactions, communication patterns, scheduling information, etc. Environment data 208 (e.g., ambient data) can include information about a location or organization associated with the first pattern and second pattern. In an example implementation, services can provide environment data regarding the physical layout of the location, relationships between the people at the location, weather information, safety information, location-based policies, etc. For example, in an office, environment data can include the office layout, organizational structure of workers, facilities and designated break areas, as well as information regarding employer break policies.

The journaling engine 210 receives, via the data collector 215, activity data 204 such as monitored data, applications data, etc., and analyzes the information, via the self-learning system 230, to build a journaling model. The self-learning system 230 includes a pattern module 233, an engagement analyzer 235, a performance mapper 237, and a model module 239.

The pattern module 233 identifies context patterns from past behavior that indicates a user prefers to provide a journal entry, such as specific times of day or detectable actions. For example, a user activity of locking a computer session may be categorized as a trigger or event indicating the user is transition to a break and ready to be engaged for self-reflection. The pattern module 233 can generate instructions or cues for the context detector 220 to watch for in real-time activity data 204. Categorization of the activity data 204 can be used to help identify the patterns, improve timing of prompts, and help the user remain actively engaged in journaling and self-reflection. The pattern module 233 tracks context patters from behavior of the user and assesses the real-time activity data with the context detector 220 to recognize activity that is aligns with recorded preferences of the user.

In an example implementation, the self-learning system 230 includes a training process to learn patterns of the user's patterns or behaviors. The pattern module 233 analyzes received activity data 204 (e.g., sensed data 206, pinpoint data 207, environment data 208, etc.) associated with a particular user to identify work activities (e.g., a first pattern or state) and preferred journaling patterns (e.g., a second pattern or state). The pattern module 233 determines context factors from the analyzed activity data 204 that indicate a working state, a preferred journaling state, or patterns of behavior that are input into the journaling model. A context pattern of the user can track context factors to identify states, for example, timing of journaling, blackout times, preferred channel by time of day, Do-Not-Disturb state, sensing permissions, etc. The context factors determined by the pattern module 233 can be used to detect changes between states of activity, verify a preferred journaling state, and/or override a scheduled engagement. In an example implementation, the pattern module 233 can categorize the user's activities as associated with different states of activities. For example, the pattern module 233 labels and categorizes different events and associate actions, messages, and/or commands.

The pattern module 233 also analyzes the user's behavior to identifying triggers or events that indicate a transition to a different state or set of actions that indicates a preferred state for journaling and/or self-reflection. Triggers or events can include duration of activity or state, physiological measures (e.g., heart rate, blood pressure, sugar levels, etc.), sequence of events, or other observable behaviors thresholds.

The model module 239 generates a customized journaling model for tracking context factors and the user's journaling activities (e.g., engagement data 265). In an example implementation, the self-learning system 230 analyzes activity data 204 from an environment to develop baseline patterns and modules that are customized via input from the feedback module 270. The model module 239 works with the engagement analyzer 235 and the performance mapper 237 to iteratively improve the journaling model as the user interacts with the journaling engine 210 over time.

Engagement data 265 can include data received during a journaling or reflective state that includes the user's reaction to prompts (e.g., journal entries, reflections, goals, feedback, etc.) and context factors that identify the preferred communication patterns. The output of the engagement analyzer 235 is used with the performance mapper 237 to update the journaling model with new topics, task progress, goal completions and other detectable performance measurements.

The engagement analyzer 235 analyzes the engagement data 265 received from the user during a journal or reflection state. For example, the engagement analyzer 235 can analyze term usage from a text based response or transcription of an audio reflection captured from the user. In some implementations, analysis of the engagement data can also be used to track emotions, language patterns, and preferences as part of the journaling model. For example, the engagement analyzer 235 can conduct speech emotion analysis on recorded audio of the engagement data 265 to track vocal behavior and nonverbal aspects as a marker of affect (e.g., emotions, moods, and stress). The engagement analyzer 235 performs content analysis to identify content topics from the engagement data 265 and the performance mapper 237 tracks the activity and/or thoughts for each topic.

The performance mapper 237 with the pattern module 233 can identify activities, time periods, locations, etc. from engagement data 265, and the model module 239 can assign labels and/or categories to update and maintain the context factors associated with a topic in the journaling model. The performance mapper 237 can organize the recorded activity and/or thoughts with the real-time activity data 204 for an engagement to update the journaling model via the model module 239. Engagement data 265 is processed by the self-learning system 230 to maintain the journaling model with changes in the behavior of the user, record communication preferences with context factors, and identify additional opportunities for journaling and self-reflection.

The self-learning system 230 builds and maintains the journaling model and interacts with the engagement controller 240 to provide adaptive prompts, receive engagement data 265, and update the journaling model. The self-learning system 230 can include the engagement controller 240 or be operatively coupled to the engagement controller 240. As used herein, reference to the self-learning system 230 includes functionalities and aspects described as parts of the engagement controller 240 and vice versa. The journaling model uses content and analysis of the user's behavior to influence delivery of a prompt payload 260 for more effective engagement in journaling.

The engagement controller 240 includes a scheduler 243, a prompt generator 245, a language module 247, and a channel module 249. Based on the engagement analysis by the self-learning system 230, the engagement controller 240 uses sensed context to improve the timing, channel choice, and language to generate prompts that engage the user through a conversational-agent interaction. The engagement controller 240 adaptively provides a prompt payload 260 via a selected communication channel 205 to initiate the autonomous interaction and receive the engagement data 265.

The prompt generator 245 can construct static or dynamic questions to motivate the user to engage in self-reflection. The prompt generator 245 can maintain a library of static pre-composed prompts or prompt templates for use with the journaling model to track the user's responsiveness. For example, the prompt generator 245 can employ a static prompt of "What did you accomplish this morning?", "What are your plans for the rest of the day?" for regularly schedule journaling activities based on the effectiveness of the engagement data 265 tracked by the journaling model. A prompt template can integrate activity data 204, for example, "What have you been working on in the last <time>?", "What project is file <filename> for? What progress have you made on this project?

The prompt generator 245 can construct dynamic questions that integrate activity data 204 with natural language processors based on tracked sentiments of the user, for example, "Did you intend to miss the staff meeting?", "Would you be interested in requesting assistance with <task>?" In some implementations, analysis of the content of daily journal response can be used to generate an ordered list of prompts. For example, he ordering of prompts can be based on aspects such as sentiment analysis, and also ensuring novelty of prompts that improve user engagement. The choice of channel can also be used to reorder the list of prompts and adapt the language or individual prompts.

The channel module 249 can select a communication means for delivering the prompt payload 260. Based on analysis of past interactions, the channel module 249 learn the effect of a channel on the quality (e.g., in length) of user responses in view of context factors. Based on the selected communication channel, the generated prompt can be modified or a different version of the prompt can be generated. The channel module 249 can select based on real-time activity data from the context detector 220.

For example, if the user is currently online and logged on to a chat client/site, the channel module 249 may choose to engage with the user through chat. If the context detector 220 determines that the user is alone in a private space, the channel module 249 may determine to engage with the user using voice over a speaker. In another example, the context detector 220 may determine that the user has been present at their workstation for an extended time period and may benefit from stepping away based on the journaling model. The channel module 249 can select a communication means based on past behavior of the user that matches or has similar context factors with the detected context. In the example, the channel module 249 can select to deliver the prompt payload 260 through voice on a private mobile device.

In some implementations, the context detector 220 is included in the journaling engine 210, may be hosted by a client device 105a-105n, and may notify the journaling engine 210 of real-time activity data 204 at the location of the user that matches preferred journaling or self-reflection state. In an example implementation, the context detector 220 tracks user activity to identify changes in particular levels of activity. For example, the context detector 220 can monitor data from a heart rate sensor, track a user's heart rate data, and identify a change in the user's level of activity, based on a change in the user's heart rate that satisfies a threshold, percentage, deviation, etc.

The language module 247 interacts with the engagement analyzer 235 to improve prompts generated by the engagement controller 240. The language module 247 can maintain a user defined vocabulary for tracking term usage, tone preferences, and formats from the engagement data 265. The language module 247 can provide the prompt generator 245 with customized prompts that is adapted to the user's preferred language style to improve user engagement. In an example implementation, the engagement analyzer 235 can detect a sentiment or tone from the engagement data 265 responding to a specific prompt payload 260, and the language module 247 can modify a subsequently generated prompt to return the preferred tone or sentiment. For example, the user may indicate a preference to communicate informally with the journaling engine 210 reflecting on certain topics.

The scheduler 243 can internally track topics from the journaling model and prioritize or order engagements. The scheduler 243 can set timers (e.g., count-up, count-down, interval counter, etc.) for specific topics, tasks, or goals from the model module 239. The scheduler 243 can use the context detector 220 to monitor available activity data 204 of the user. The context detector 220 uses real-time activity data 204 to detect changes in the user's activities that match or satisfy a pattern and/or triggers indicated by the pattern module 233. The context detector 220 can act as a state monitor to detect activity data 204 to change a selected communication channel, delay a scheduled engagement, and/or override the prompt from interrupting the user. For example, a wrist-worn sensor can detect a user's heartrate over a threshold, based on assumed stress level, and trigger the engagement controller 240 to initiate journaling.

According to an example implementation, the scheduler 243 can provide internal feedback to the model module 239 to update the journaling model without interruption the user. For a user with inconsistent or sporadic journaling habits, the scheduler 243 can arbitrage or manage a backlog of journal topics. If the user disengages from journaling for a period of time, the scheduler 243 can timeout topics from the journaling model without interrupting the user. Accordingly, when the user re-engages the journaling engine 210, the engagement controller 240 can effectively motivate the user to achieve current goals and tasks rather than be burdened with digital house-keeping and clean-up.

The feedback module 270 is configured to provide evaluation information back to the self-learning system 230 for refining and improving the self-learning system 230 functionality. If the self-learning system 230 learns that triggering event in view of a context factor is inconsistent with a transition, the feedback module 270 can also gather feedback information from the user to improve context detection 220.

Figure 4A:
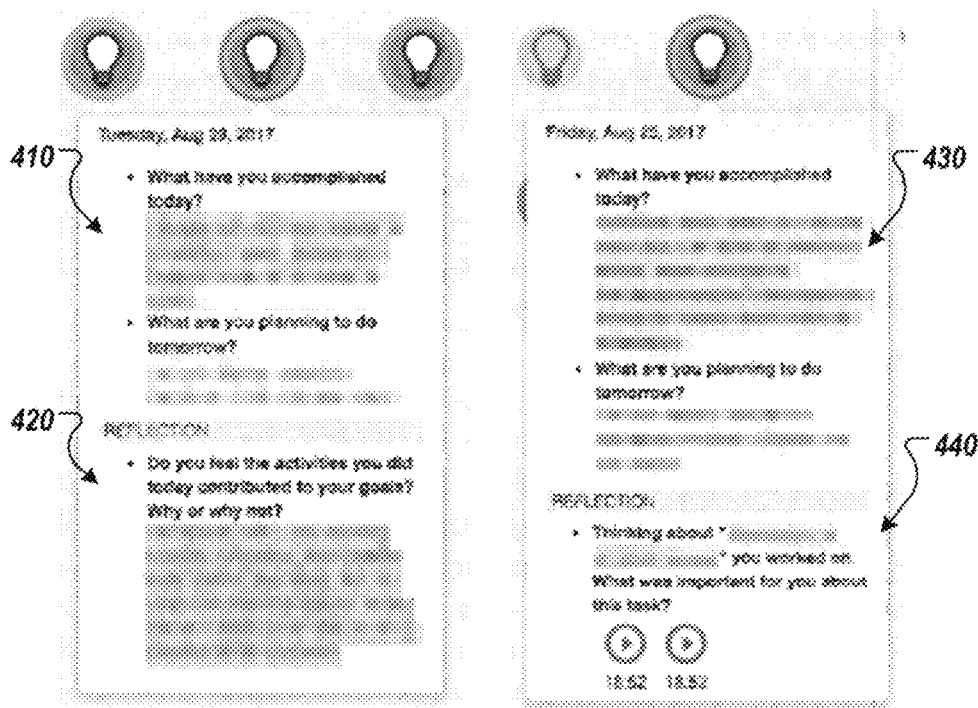
FIGS. 4A-B illustrates example interfaces for a conversational agent in accordance with an example implementation.
Figure 4B:
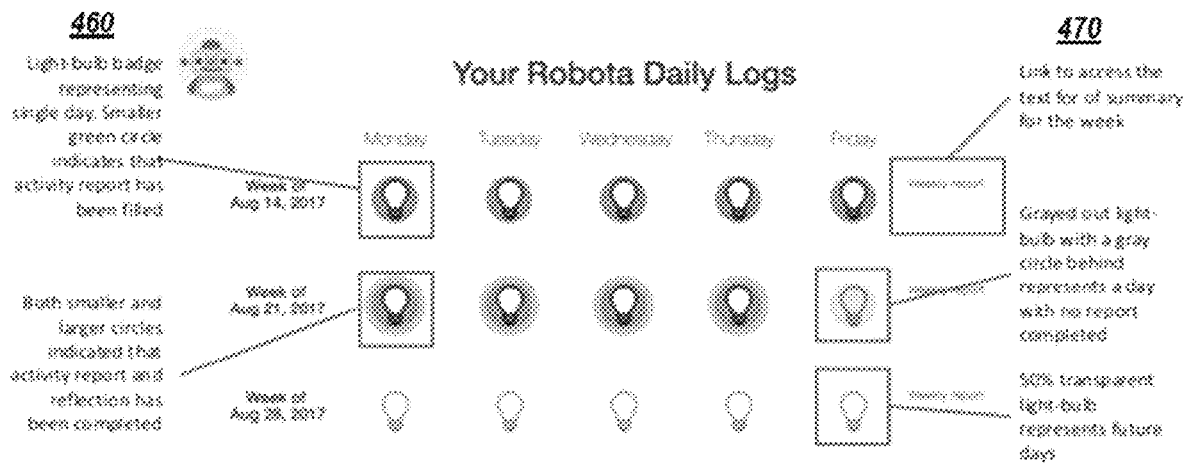

The dashboard module 275 can provide the user with access to reports, visual feedback, and manual configurations to configure or tune the journaling engine 210, as described in reference to FIGS. 4A-B. In some examples, the user may modify or change the context factors of the context pattern to provide feedback or error correct using the dashboard module 275.

Figure 3:
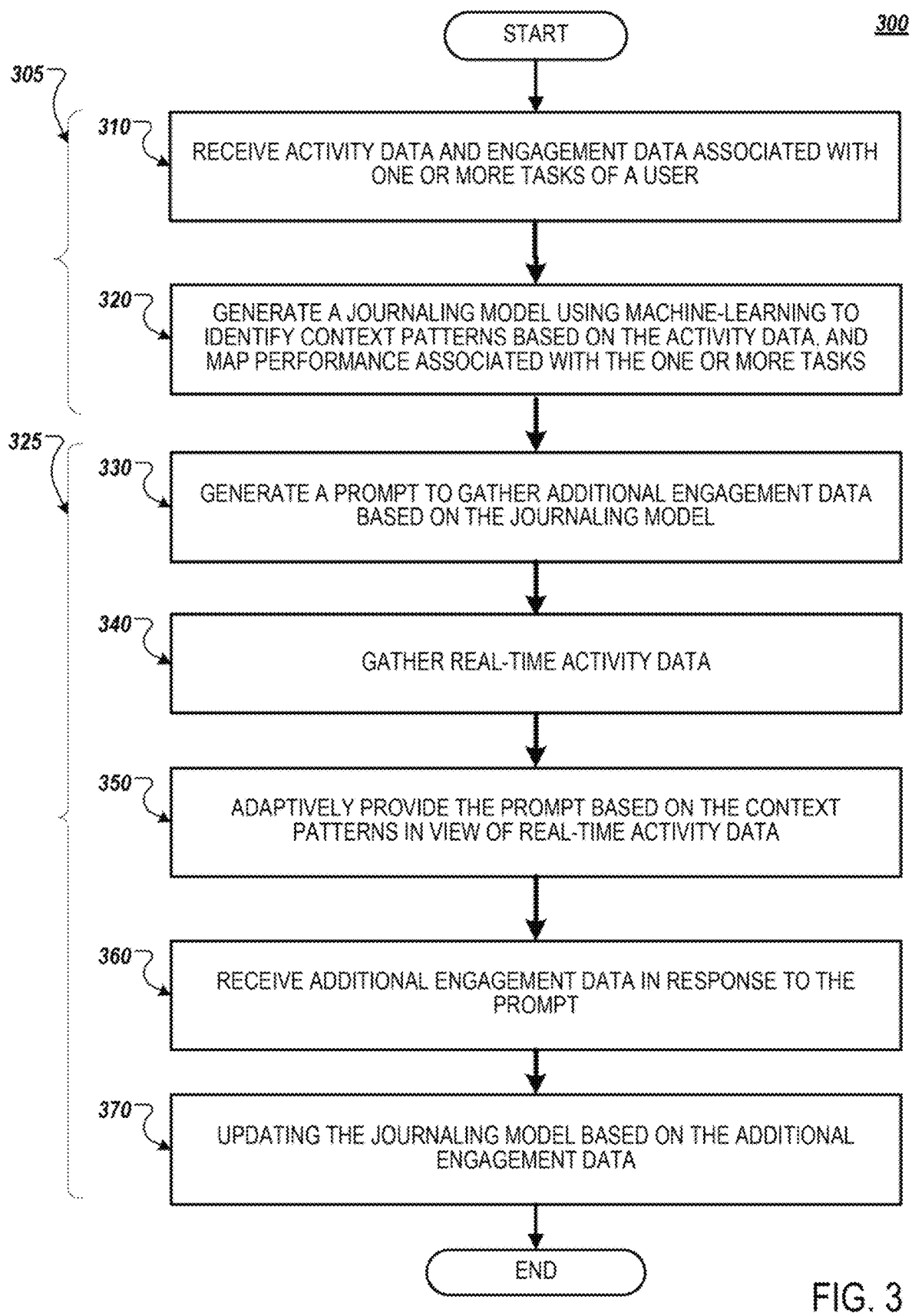
FIG. 3 illustrates a flow of an example reflection process in accordance with an example implementation.

FIG. 3 illustrates a flow of an example journaling process in accordance with an example implementation. The method 300 is performed by processing logic that may comprise hardware (circuitry, dedicated logic, etc.), software (such as operates on a general purpose computer system or a dedicated machine), or a combination of both. Method 300 may be performed by the journaling engine 110 of FIG. 1. Though method 300 is described below as being performed by a journaling engine, method 300 may also be performed by other processing logic.

At 310, the processing device receives activity data and engagement data associated with one or more tasks of a user. Activity data can include sensed activities of the user, for example, location data, physiological data, computer usage, phone usage, or sensor data. Engagement data can include a previous response form the user for a journal entry or self-reflection on a goal associated with one or more tasks. For example, the one or more tasks can be related work, fitness, and personal goals of the user.

At 320, the processing device generates a journaling model using machine-learning to identify context patterns based on the activity data, and map performance associated with the one or more tasks. For example, machine-learning can use training data, user preferences, and clinical guidelines to identify context patterns. According to an example implementation, mapping the performance associated with one or more tasks can include analyzing the engagement data to identify content topics and sentiment indicators, associating each of the one or more tasks with at least one content topic, tracking the sentiment indicators for each topic; and mapping performance for each topic based on changes of the sentiment indicators from additional engagement data.

At 330, the processing device generates a prompt to gather additional engagement data based on the journaling model. For example, a topic can be selected from the journaling model, and the prompt can be question relating the topic generated by a natural language processor. In some implementations, the form or type of the question can be modified based on a preferred interaction mode. For example, different interaction mode can be selected to provide text via a chat-bot, audio via a speaker, or a virtual avatar via display or headset.

At 340, the processing device gathers real-time activity data, and at 350, adaptively provides the prompt based on the context patterns in view of real-time activity data. The interaction mode can be selected based on detecting context factors in the real-time activity data that matching or satisfy a preferred interaction state in the context pattern.

The user can respond to the prompt with self-reflection or journaling information at 360. The processing device updates the journaling model based on the additional engagement data at 370.

In some example implementations, method 300 may be implemented with different, fewer, or more blocks. In an example implementation, blocks 310-320 may be implemented independently from blocks 330-370. For example, blocks 310-320 can be implemented as part of a training phase by a device to generate a model, and blocks 330-370 can be implemented as part of an engagement phase by another device repeatedly to apply the model. In some example implementations, the process can periodically return to one of blocks 310-320 to incorporate feedback and update the model as described in greater detail in reference to FIGS. 2 and 6. Method 300 may be implemented as computer executable instructions, which can be stored on a medium, loaded onto one or more processors of one or more computing devices, and executed as a computer-implemented method.

FIGS. 4A-B illustrates example interfaces for a conversational agent in accordance with an example implementation. FIG. 4A illustrates example interface for a conversational agent in accordance with an example implementation. A journaling application, such as a mobile application running on a smartphone, can be used by the user to manage to journaling engine. For example, at 410 and 430 a prompt for the user to journal about "What have you accomplished?" can be followed with another prompt about future goals "What are you planning to do tomorrow?" At 420 and 440, example journaling prompts can include "Do you feel the activities you did today contribute to your goals? Why or why not?" A dynamic prompt can include "thinking about <task> you worked. What was important for you about this task?"

Other example interfaces can include graphical elements (e.g., an avatar), an audio channel, etc. The user may receive prompts and interact through multiple interfaces based on the analyzed behavioral patterns and preferences. For example, a prompt from a text based interface can allow the user to passively delay reading the prompt for a couple minutes, re-read the prompt, edit or review a response prior to submitting, etc. A prompt from a voice based interface can use sound cues to condition or stimulate the user and prompt different responses than the text based interface.

A user may prefer to interact though an audio interface when in private context and a visual interface in a public or workplace context. The conversational agent can call a user on their phones or through a handheld cloud-connected device with a built-in speaker and microphone. The conversational agent combines support for autonomous interaction through multiple interfaces and interfaces of different types (e.g., text, voice, visual, etc.).

The conversational agent is configured for interaction with a single unique user. In some implementations, the conversational agent can include active and passive authentication processes (e.g., password, token, facial recognition, etc.) before providing a prompt. For example, passive authentication can use detected context factors (e.g., logging into a banking website, unlocking a smartphone, a RFID signal from an employee badge or credit card, facial recognition, voice recognition, etc.) to authenticate the user through monitored activity rather than requiring direct authentication with the conversational agent.

FIG. 4B illustrates example interface for a conversational agent in accordance with an example implementation. The dashboard interface in 4B can provide the user with information regarding their patterns, behaviors, and performances during a time period. For example, at 460 the dashboard can provide indicator representing self-reflection activity. At 470, the user can access historical data including logs of response to inspect their engagement data.

For example, the dashboard can uses badges to represent each day to encourage continued participation. The use of lightbulbs for progress serves to highlight intended use for personal journaling and self-learning. A lit lightbulb over a green circle represents a day the user has completed a journal entry. An additional light-green ring indicates the user has responded to a reflection question. A day with no journal entry and reflection is represented by a grey lightbulb over a grey circle. Reviewing journal entries and reflection for a specific day can displayed by clicking on a lightbulb and a pop-up with details the questions asked and user's responses.

Figure 5:
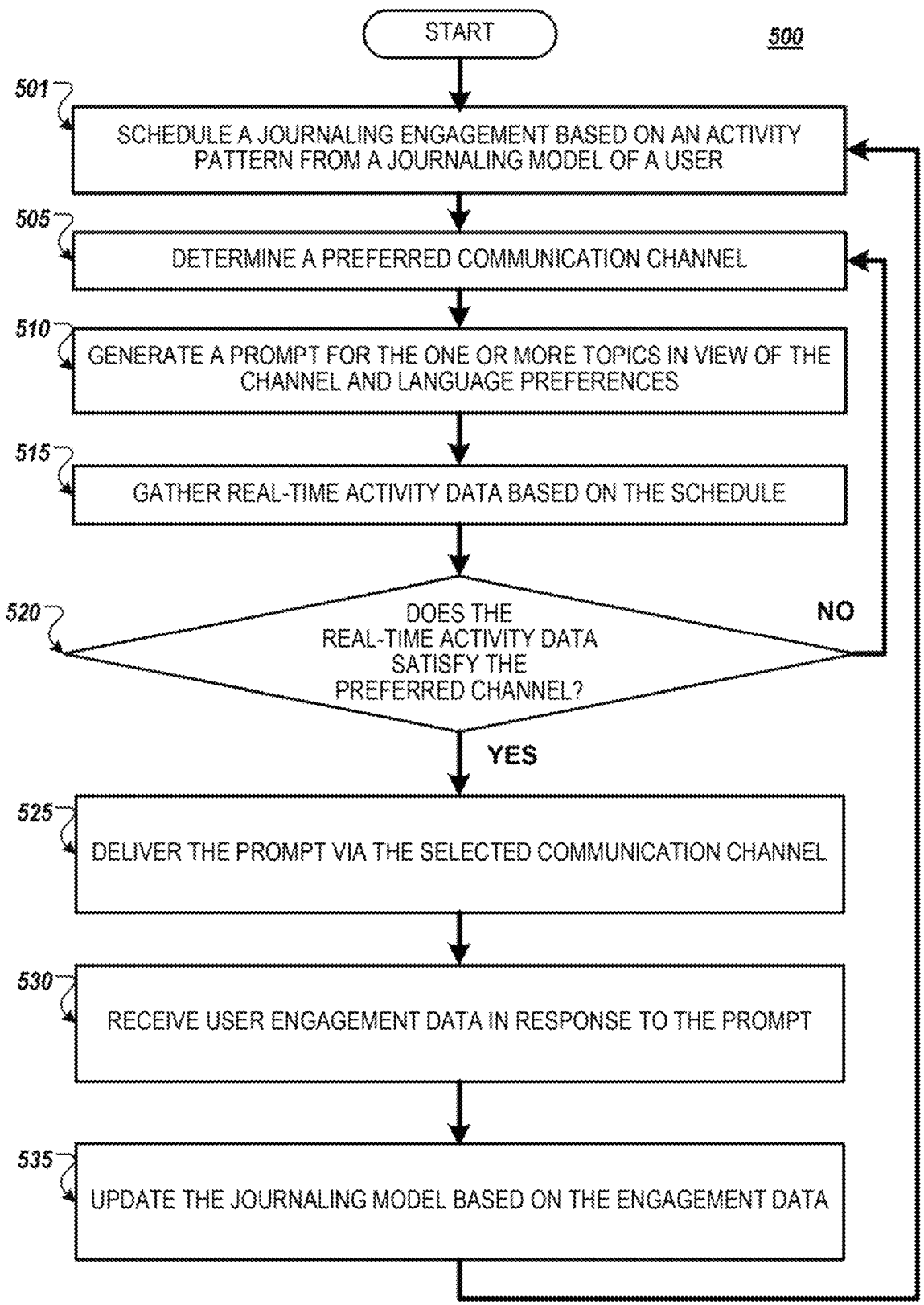
FIG. 5 illustrates an engagement flow diagram for a journaling model in accordance with an example implementation.

FIG. 5 illustrates an engagement flow diagram for a journaling model in accordance with an example implementation. At 501, the agent schedules a journaling engagement based on an activity pattern from a journaling model of a user. For example, the agent may schedule to prompt the user based on a pre-set timing chosen by the user (a morning log, mid-day log, or an end-of-day log). The agent may prompt the user based on sensed presence; for example, when the user returns to their desk.

At 505, the agent determines a preferred channel using the journaling model. In some example implementations, the agent can offer the user the channel of interaction based on timing and sensed data. For example, if the user is currently online and logged on to a chat client/site, the system may choose to engage with the user through chat.

At 510, the process generates a prompt for the one or more topics in view of the channel and language preferences. The agent can curate prompt categories and develop prompt templates that are customized with user information. Task-related type prompts can include questions that ask about tasks and activities and how aspects of the tasks and activities may contribute to learning. For example: "How can you make the activities you planned for today more enjoyable for yourself?" Planning and organization type prompts can include questions that focus on understanding factors affecting performance and learning points from organization of work in scope of a day as well as the week. For example, "How satisfied are you with how you organized your work today? Is there anything you have learned?" Short-term and long-term activities and goals type prompts can include questions that focus on realizing relations between activities and goals, barriers to goals accomplishments, or exploring the values of having a longer-term goal. For example, "Do you feel the activities you did today contributed to your goals? Why or why not?" Motivation and satisfaction at work type prompts can include questions that trigger exploration of sources of positive and negative emotions at work or moments of satisfaction. For example: "What were some of the most satisfying moments at work for you this week and why?"

Each type of prompts can be personalized to include dynamic elements extracted from the user's journal entries, activity data, events, etc. to enhance the prompts. For example, into question "Did <task> help you learn anything new that could be valuable for the future? What did you learn?" Personalized prompts can also be generated based on analyzing previously recorded responses to related prompts to re-enforce or re-focus attention on different aspects of the user's behavior. In an example implementation, a patient on a medication or therapy regimen is prompted about the effects of the medication or about the food they ate to assist with managing health, as well as, provide useful information and insights.

Based on analysis of the content of the daily journal, an ordered list of journal prompts is generated. Journaling prompts and reflection prompts can be generated with static (pre-composed) and/or dynamically composed prompts. The ordering of prompts can be based on aspects such as sentiment analysis, and also ensuring novelty of prompts. The choice of channel can be used to reorder a list of prompts and adapt the language or individual prompts.

At 515, the agent gathers real-time activity data based on the schedule. At 520, the agent determines whether the real-time activity data satisfy the preferred channel. In response to determining the real-time activity data does not satisfy the context factors used to generate the prompt, the agent can repeat the process to modify or re-generate the prompt using context factors identified in the real-time activity data. Different channels afford different types of engagement. For example, a text prompt delivered in a chat system may be long and combine several questions into one prompt. A voice channel can include shorter responses and break down questions into shorter elements based on analysis of previous responses or behavior of the user. For example, analysis of previous responses can determine that long composed prompts should be broken down into short elements to improve the frequency, quantity, and/or quality of the response.

At 525, the agent delivers the prompt via the selected communication channel. At 530, the agent receives user engagement data in response to the prompt and updates the journaling model at 535. After 535, the agent can return to 501. The agent can also decide based on a user's response whether follow-up elements should or should not be presented. Follow-up engagements or prompts can be useful, for example, to promote work reflection which has been positively associated with improved performance. The agent can engage with the user based on analysis of the content of journals and reflection and further adapts the prompts for further engagement based on user's choices.

Figure 6:
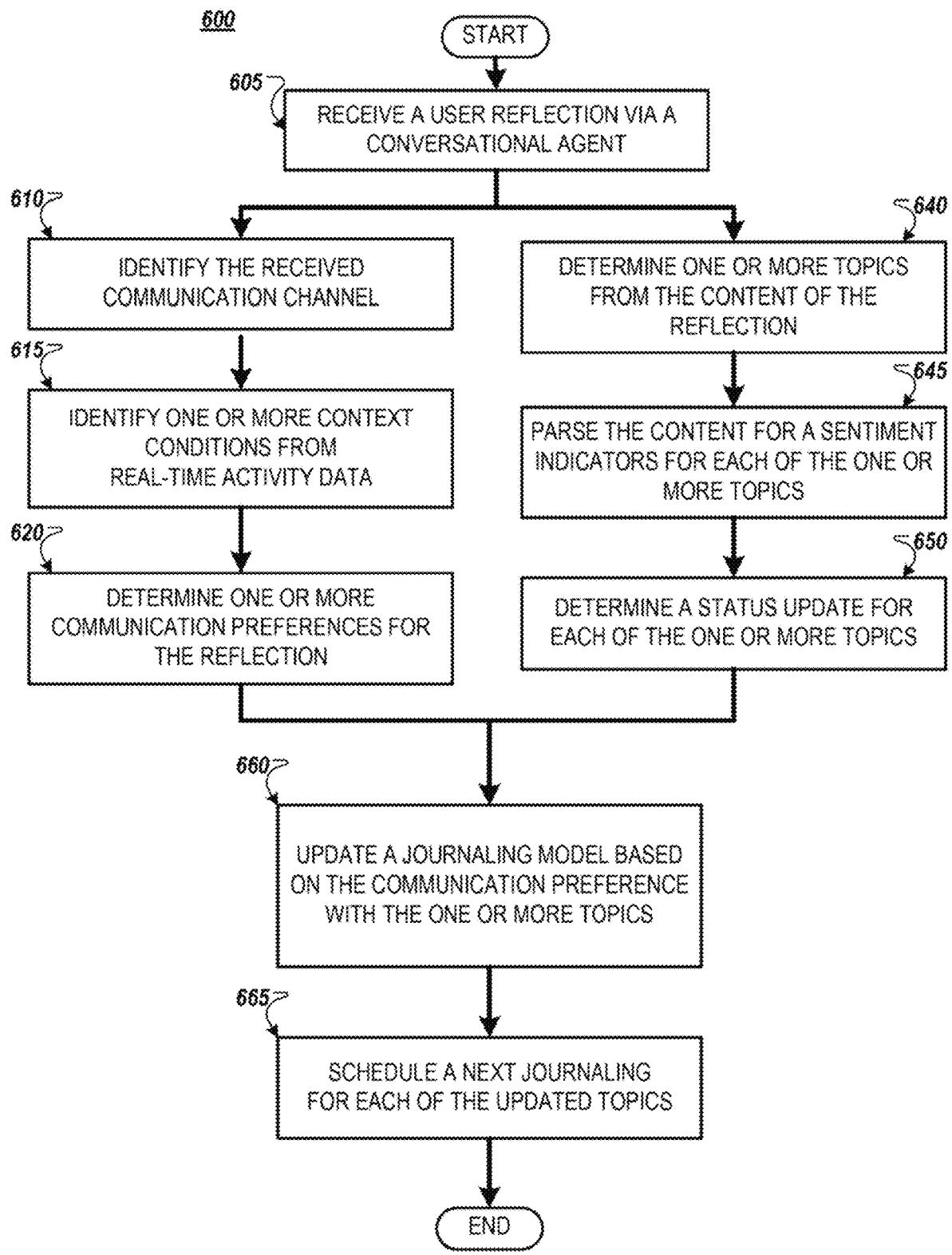
FIG. 6 illustrates a flow diagram for updating a journaling model based on a response in accordance with an example implementation.

FIG. 6 illustrates a flow diagram for updating a journaling model based on a response in accordance with an example implementation. At 605, the process receives a user reflection (e.g., a journal entry) via a conversational agent. The user reflection can improve the journaling model by analyzing objective sensed factors starting at 610 as well as analyzing content of the reflection starting at 640. For example, presence and length of a response can be used as a rough metric of engagement and compliance. The process iteratively learns over time by combination of conditions (timing, activities, location, and channel) that result in high user engagement.

At 610, the process identifies the received communication channel from the engagement data and one or more context factors from real-time activity data at 615. Based on the context factors, the process, at 620, creates a preferred communication channel for the context factors that are incorporated into the journaling model at 660.

At 640, the process identifies topics discussed in the reflection. At 645, the process parses the content for sentiment indicators. By identifying expressed sentiment in the journal entries, the journaling model can direct future interactions to a specific channel or focus on particular activities for reflection. For example, detected negative sentiment may be better served by voice interaction that requires the user to step away from their work.

At 650, the process records a status update for the topics to track progress and performance. By detecting recurring plans and activities over time, the journaling model aggregates recurring mentions of activities to prompt the user about whether progress is being made, or what blockers are present. At 660, the journaling model is updated to associate the objective sensed factor with the detected substantive topics to improve user engagement. At 665, the process can schedule a next reflection or journal entry for the topics to aid the user in achieving goals.

Figure 7:
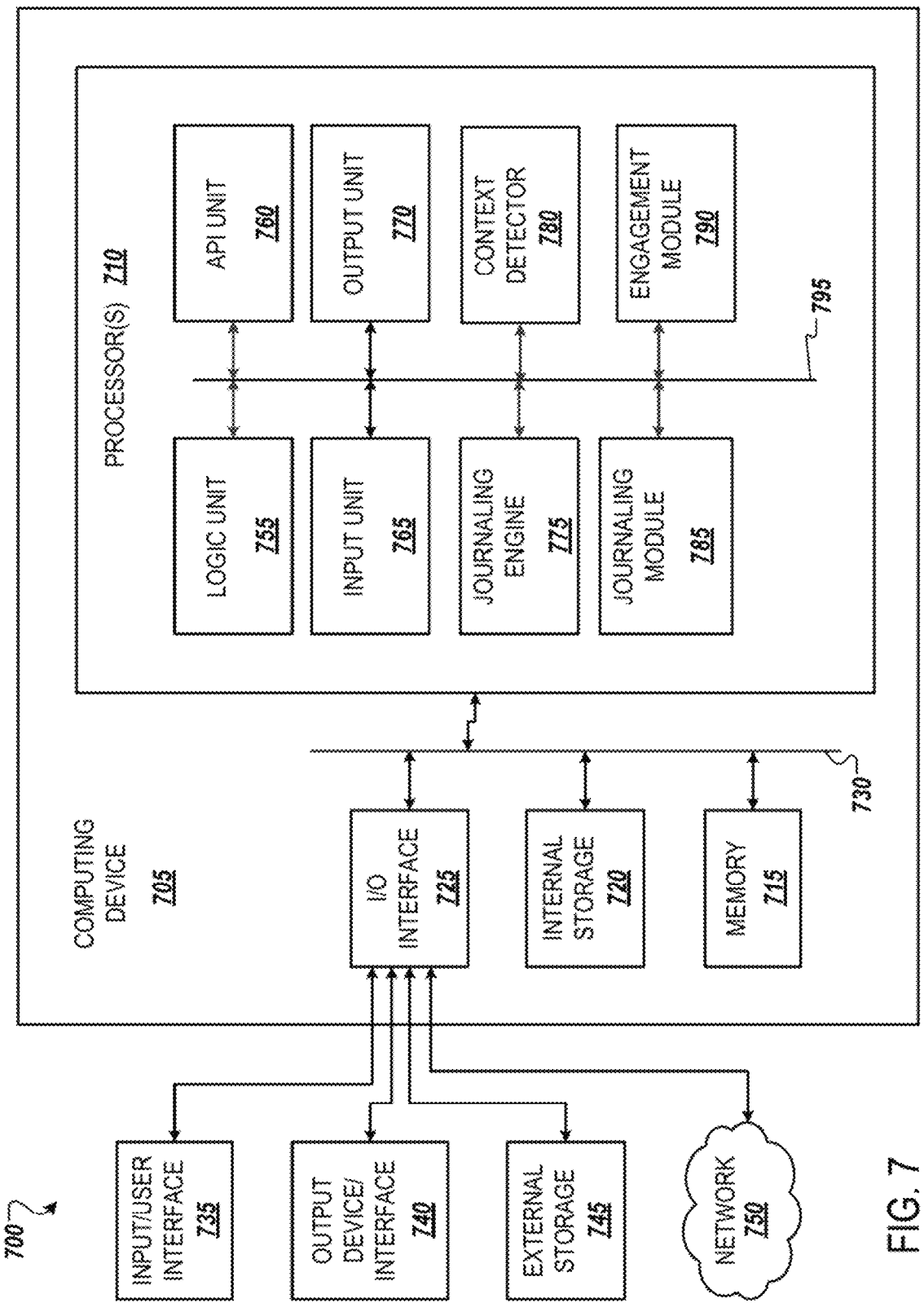
FIG. 7 illustrates an example server computing environment with an example computer device suitable for use in example implementations.

FIG. 7 shows an example computing environment with an example computing device associated with the external host for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touchscreen interface, keyboard, a pointing/cursor control, microphone, camera, braille, motion sensor, optical reader, and/or the like).

Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

The I/O interface 725 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 710 can execute under any operating system (OS) (not shown), in a native or virtual environment. One or more applications can be deployed that include logic unit 755, application programming interface (API) unit 760, input unit 765, output unit 770, journaling engine 775, context detector 780, journaling module 785, and engagement module 790.

For example, input unit 765, journaling engine 775, context detector 780, journaling module 785, and engagement module 790 may implement one or more processes shown in FIGS. 3-6. In an example implementation, the journaling module 785 is used to understand activity of a patient on a medication or therapy regimen. The engagement module 790 uses the context detector 780 to prompt the user about their reaction to the medication or about the food they ate to assist with managing health, as well as, provide useful information and insights. The described units and elements can be varied in design, function, configuration, or implementation and are not limited to the descriptions provided.

In some example implementations, when information or an execution instruction is received by API unit 760, it may be communicated to one or more other units (e.g., logic unit 755, output unit 770, input unit 765, journaling engine 775, context detector 780, journaling module 785, and engagement module 790).

Input unit 765 may, via API unit 760, interact with the journaling engine 775 and context detector 780 to provide the input information associated with activity. Using API unit 760, journaling module 785 can analyze the information to identify behavior patterns and generate a journaling model for the user that adaptively prompts to reflect and return engagement data. Engagement module 790 may customize and process the engagement data for updating the journaling model, for example.

In some instances, logic unit 755 may be configured to control the information flow among the units and direct the services provided by API unit 760, input unit 765, output unit 770, input unit 765, journaling engine 775, context detector 780, journaling module 785, and engagement module 790 in some example implementations described above. For example, the flow of one or more processes or implementations may be controlled by logic unit 755 alone or in conjunction with API unit 760.

Figure 8:
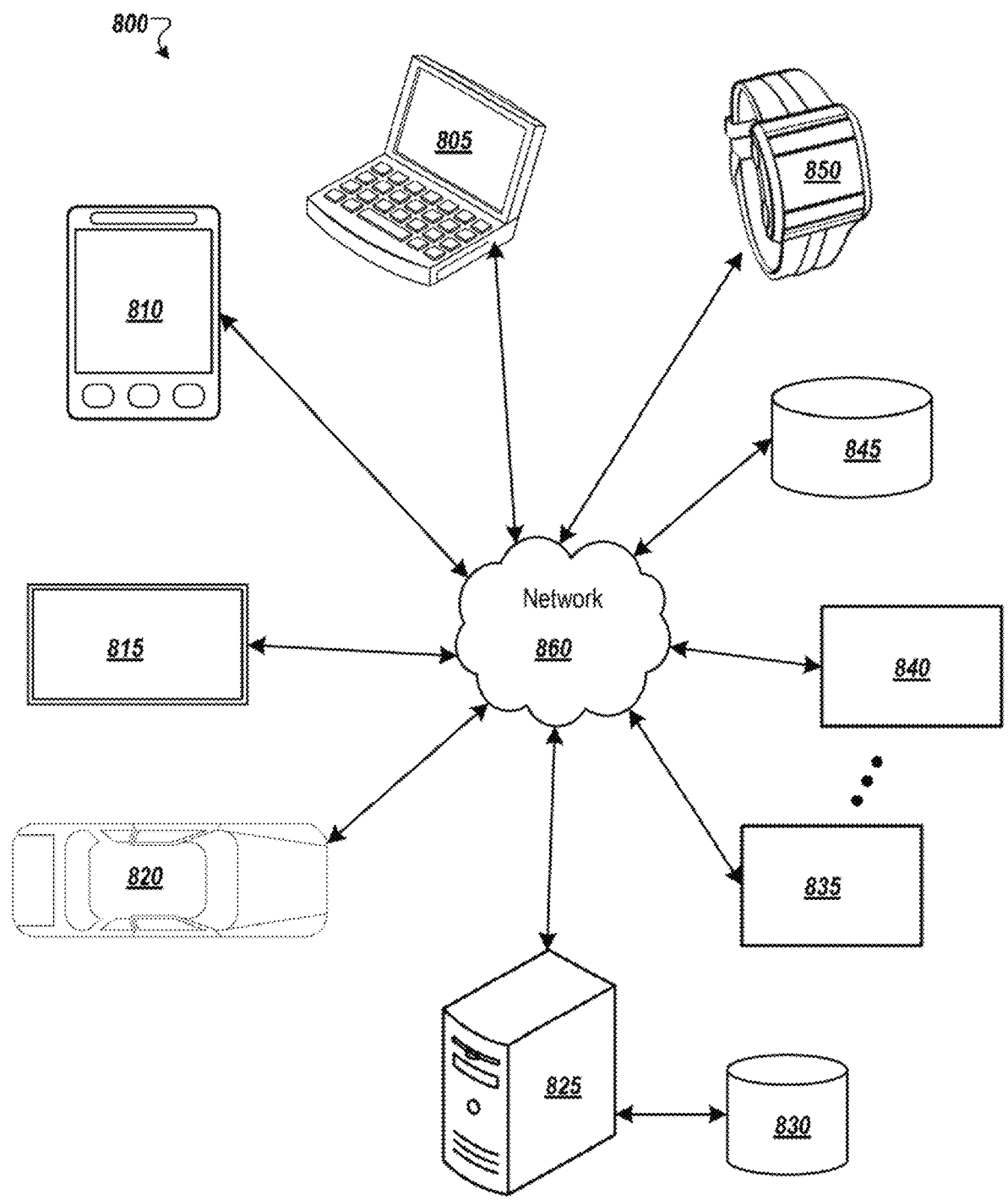
FIG. 8 illustrates an example networking environment with example computer devices suitable for use in example implementations.

FIG. 8 shows an example environment suitable for some example implementations. Environment 800 includes devices 805-850, and each is communicatively connected to at least one other device via, for example, network 860 (e.g., by wired and/or wireless connections). Some devices may be communicatively connected to one or more storage devices 830 and 845.

An example of one or more devices 805-850 may be computing devices 705 described in regards to FIG. 7, respectively. Devices 805-850 may include, but are not limited to, a computer 805 (e.g., a laptop computing device) having a display and as associated webcam as explained above, a mobile device 810 (e.g., smartphone or tablet), a television 815, a device associated with a vehicle 820, a server computer 825, computing devices 835-840, storage devices 830 and 845. As explained above, the meeting environment of the user may vary, and is not limited to an office environment.

In some implementations, devices 805-820, 850 may be considered user devices associated with the user of the enterprise. Devices 825-850 may be devices associated with client service (e.g., used by the user or administrators to provide services as described above and with respect to FIGS. 1-2, and/or store data, such as sensed data, pinpoint data, environment data, webpages, text, text portions, images, image portions, audios, audio segments, videos, video segments, and/or information thereabout).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as "generating," "identifying," "mapping," "providing," "updating," "analyzing," "tracking," "determining," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application.

Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

The example implementations may have various differences and advantages over related art. For example, but not by way of limitation, as opposed to instrumenting web pages with JavaScript as explained above with respect to the related art, text and mouse (e.g., pointing) actions may be detected and analyzed in video documents.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for context aware journaling comprising:
generating, by a software conversational agent, a journaling model based on a first real-time activity data, and engagement data associated with one or more tasks of a user, wherein the journaling, model uses machine-learning to:
identify a preconfigured context pattern on associated with the first real-time activity data, and
map performance associated with the one or more tasks based at least on the engagement data;
determining a preferred interaction mode from a plurality of interaction modes based on comparing a second real-time activity data to the identified context pattern;

generating prompts based on the journaling model and the determined preferred interaction mode, the prompts comprising a series of prompts generated based on topics selected by the journaling model, each prompt is generated based on a user sentiment indicator from the journaling model and content of each prompt is adapted based on the determined preferred interaction mode;

adaptively providing one or more of the prompts to gather an additional engagement data on the selected topic based on the identified context pattern in view of the second real-time activity data, wherein adaptively providing the prompt comprises an autonomous interaction to initiate feedback from the user on the topic selected by the journaling model using the determined preferred interaction mode; and updating a set of journal entries of the journaling model for the selected topic based on receiving the additional engagement data, wherein to map performance associated with one or more tasks comprises:
  analyzing the engagement data of the user associated with the one or more tasks to identify content topics and the user sentiment indicators for each of the one or more tasks;
  associating each of the one or more tasks with at least one content topic;
  tracking the user sentiment indicators through each of the one or MOM tasks for each respective topic; and
  mapping performance for each respective topic based at least on changes of the tracked user sentiment indicators from the additional engagement data.

2. The method of claim 1, wherein adaptively providing the prompt comprise an autonomous interaction using at least one of a chat-bot an audio agent, and a virtual avatar.

3. The method of claim 1, wherein the additional engagement data comprising self-reflection on a goal associated with one or more tasks.

4. The method of claim 1, wherein generating the prompt comprises:
  selecting a topic from the journaling model; and
  determining a question using a natural language processor based on a preferred interaction mode.

5. The method of claim 1, further comprising at least one additional prompt based on the additional engagement data.

6. The method of claim 1, wherein engagement data comprises feedback associated with the one or more tasks and wherein adaptively providing the prompt comprises:
  gathering the second real-time activity data from a location of the user; and
  initiating the autonomous interaction with the user in the determined preferred interaction mode.

7. The method of claim 1, wherein adaptively providing the prompt is triggered based on assessing the second real-time activity data in view of the identified context pattern.

8. The method of claim 1, wherein adaptively providing the prompt comprises selecting an output device based on the second real-time activity data in view of the identified context pattern.

9. The method of claim 1, wherein activity data comprises one or more of location data, physiological data, computer usage, phone usage, and sensor data.

10. The method of claim 1, wherein the one or more tasks are associated with at least one of work, fitness, and personal goals of the user.

11. The method of claim 1, wherein the journaling model is generated using machine-learning further associated with one or more of training data, user preferences, and clinical guidelines.

12. The method of claim 1, wherein the series of prompts are ordered based on the determined preferred interaction mode.

13. The method of claim 1, wherein the content of the prompts comprises dynamic elements extracted from prior engagement data.

14. A system comprising:
a memory; and
a processor coupled to the memory configured to:
  generate, by a software conversational agent, a journaling model based on a first real-time activity data and engagement data associated with one or more tasks of a user, wherein the journaling model uses machine-learning to:
    identify a preconfigured context pattern associated with the first real-time activity data, and
    map performance associated with the one or more tasks based at least on the engagement data;
  determine a preferred interaction mode from a plurality of interaction modes based on comparing a second real-time activity data with the identified context pattern;
  generating prompts based on the journaling model and the determined preferred interaction mode, the prompts comprising a series of prompts generated based on topics selected by the journaling model, each prompt is generated based on a user sentiment indicator from the journaling model and content of each prompt is adapted based on the determined preferred interaction mode;
  adaptively providing one or more of the prompts to gather an additional engagement data on the selected topic based on the identified context pattern in view of the second real-time activity data, wherein adaptively providing the prompt comprises an autonomous interaction to initiate feedback from the user on the topic by the journaling model using the determined preferred interaction mode; and
  updating a set of journal entries of the journaling model for the selected topic based on receiving the additional engagement data,
  wherein to map performance associated with one or more tasks comprises:
    analyzing the engagement data of the user associated with the one or more tasks to identify content topics and the user sentiment indicators for each of the one or more tasks:
    associating each of the one or more tasks with at least one content topic;
    tracking the user sentiment indicators through each of the one or more tasks for each respective topic; and
    mapping performance for each respective topic based at least on changes of the tracked user sentiment indicators from the additional engagement data.

15. The system of claim 14, wherein the plurality of preferred interaction modes includes at least one of a chat-bot, an audio agent, and a virtual avatar.

16. The system of claim 14, wherein to adaptively provide the prompt, the processor is further to compare the second real-time activity data from a location of the user to the identified context pattern to determine an output modality for the prompt, wherein the output modality is text, audio, or visual.

17. A non-transitory computer readable medium, comprising instructions that when execute by a processor, the instructions to:
   generate, by a software conversational agent, a journaling model based on a first real-time activity data and engagement data associated with one or more tasks of a user, wherein the journaling model uses machine-learning to:
      identify a preconfigured context pattern associated with the first real-time activity data, and
      map performance associated with the one or more tasks based at least on the engagement data;
   determine a preferred interaction mode from a plurality of interaction modes based on comparing second real-time activity data with the identified context pattern;
   generating prompts based on the journaling model and the determined preferred interaction mode, the prompts comprising a series of prompts generated based on topics selected by the journaling model, each prompt is generated based on a user sentiment indicator from the journaling model and content of each prompt is adapted based on the determined preferred interaction mode:
   adaptively providing one or more of the prompts to gather an additional engagement data on the selected topic based on the identified context pattern in view of the second real-time activity data, wherein adaptively providing the prompt comprises an autonomous interaction to initiate feedback from the user on the topic selected by the journaling model using the determined preferred interaction mode; and
   updating a set of journal entries of the journaling model for the selected topic based on receiving the additional engagement data,
   wherein to map performance associated with one or more tasks comprises:
      analyzing the engagement data of the user associated with the one or more tasks to identify content topics and the user sentiment indicators for each of the one or more tasks;
      associating each of the one or more tasks with at least one content topic;
      tracking the user sentiment indicators through each of the one or more tasks for each respective topic; and
      mapping performance for each respective topic based at least on changes of the tracked user sentiment indicators from the additional engagement data.

18. The non-transitory computer readable medium of claim 17, wherein the prompt is triggered based on a pre-set schedule.

19. The non-transitory computer readable medium of claim 17, wherein the prompt comprises a series of questions, wherein the series of questions are generated based on topics from the journaling model, wherein each question is generated based on a user sentiment indicator from the journaling model, wherein each question is adapted based on a type of output device.

\* \* \* \* \*